United States Patent
Sanchez

(10) Patent No.: US 6,662,058 B1
(45) Date of Patent: Dec. 9, 2003

(54) ADAPTIVE PREDICTIVE EXPERT CONTROL SYSTEM

(76) Inventor: Juan Martín Sanchez, Plaza Valle de la Jarosa, 77, 28035 Madrid (ES)

(*) Notice: Subject to any disclaimer, the term of this patent is extended or adjusted under 35 U.S.C. 154(b) by 525 days.

(21) Appl. No.: 09/604,035

(22) Filed: Jun. 27, 2000

Related U.S. Application Data

(60) Provisional application No. 60/141,366, filed on Jun. 28, 1999.

(51) Int. Cl.[7] .............................. G05B 13/02
(52) U.S. Cl. .................. 700/44; 700/31; 700/34; 700/49; 700/50; 700/74
(58) Field of Search ................. 700/34, 49, 50, 700/29–33, 44, 73, 74; 706/47, 60, 8, 14, 52

(56) References Cited

U.S. PATENT DOCUMENTS

| | | | | |
|---|---|---|---|---|
| 4,197,576 A | * | 4/1980 | Martin Sanchez | 364/106 |
| 4,358,822 A | * | 11/1982 | Sanchez | 364/151 |
| 4,634,946 A | * | 1/1987 | Moulds, III et al. | 318/561 |
| 5,457,625 A | * | 10/1995 | Lim et al. | 364/149 |
| 5,519,605 A | * | 5/1996 | Cawlfield | 364/151 |
| 5,659,667 A | * | 8/1997 | Buescher et al. | 395/23 |
| 5,841,652 A | * | 11/1998 | Sanchez | 364/164 |

FOREIGN PATENT DOCUMENTS

EP 0037579 10/1981

OTHER PUBLICATIONS

Coelho A A R: "Multi–Loop Adaptive Controllers in Non-linear Process Control"—Proceedings of the Conference on Decision and Control, US, New York, IEEE, vol. Conf. 30, Dec. 11, 1991 pp. 2909–2914, XP000279392, ISBN: 0–7803–0450–0, p. 2910, Left–Hand Column, Line 12 –p. 2911, Right–Hand Column, Line 6.

International Search Report Dated Jan. 10, 2001 Issued in the Corresponding PCT Application.

* cited by examiner

Primary Examiner—Paul P. Gordon
(74) Attorney, Agent, or Firm—Ostrolenk, Faber, Gerb & Soffen, LL

(57) ABSTRACT

An adaptive predictive expert control system for controlling single-input single-output, or multi-variable time-variant processes with known or unknown parameters and with or without time delay, is disclosed. The adaptive predictive expert control system of the present invention adds an expert block into the operation of previously known adaptive predictive control systems. This expert block based on rules and in the evolution of the process variables, determines and/or modifies the operation of the driver block, control block and adaptive feedback mechanism of the previous art, in order to improve the performance, robustness and stability of the overall control system.

19 Claims, 3 Drawing Sheets

ADAPTIVE PREDICTIVE EXPERT CONTROL SYSTEM

CROSS REFERENCE TO RELATED APPLICATION

This application claims the benefit and priority of U.S. Provisional Application No. 60/141,366 filed Jun. 28, 1999, and entitled ADAPTIVE PREDICTIVE EXPERT CONTROL SYSTEM, the disclosure of which is incorporated herein by reference.

BACKGROUND OF THE INVENTION

1. Field of the Invention

The present invention is directed to an adaptive predictive expert control system for controlling single-input single-output, or multivariable time-variant processes, with known or unknown parameters and with or without time delay. More particularly, the present invention is directed to a system with an expert block controlling previously known adaptive-predictive control systems. This expert block operates using rules that can determine and/or modify the operation of a driver block, a control block and an adaptive mechanism. The expert block can accommodate evolution of the process input/output (I/O) variables used with the above blocks and mechanisms. Application of the expert block to control systems defined in previous adaptive-predictive methodologies improves performance, robustness and stability of the overall system.

2. Description of the Related Prior Art

The application of adaptive-predictive control systems using adaptive-predictive controllers is well known. Such adaptive-predictive control systems are described in European Patent No. 0037579, issued Aug. 20, 1986, entitled "Adaptive-Predictive Control Method and Adaptive-Predictive Control System", U.S. Pat. No. 4,358,822 issued Nov. 9, 1982, entitled "Adaptive-Predictive Control System", which is hereby incorporated by reference; U.S. Pat. No. 4,197,576, issued Apr. 8, 1980, entitled "Adaptive-Predictive Control System"; and United Kingdom Patent No. 1583545, dated Jul. 1, 1977 and entitled "Improvements In an Relating to Control Systems", all issued to the present applicant.

The adaptive-predictive controllers are operable to predict, by means of an adaptive-predictive (AP) model included in the control block, the value of a set of dynamic process output variables. The set of dynamic process output variables form a dynamic process output vector at a future sampling instant. The adaptive-predictive controller also generate at each sampling instant, using the AP model, a predicted control vector that causes the predicted dynamic process output vector to equal a desired dynamic process output vector at the future sampling instant. The desired dynamic process output vector is generated by a driver block according to desired performance criterion.

In addition, adaptive-predictive controllers include an adaptive mechanism that periodically updates the parameters of the AP model within the control block. The updates occur in such a way that the difference between the actual value of the dynamic process output vector at the future sampling instant and the value of the dynamic process output vector predicted by the control block is reduced towards zero.

Adaptive-predictive control systems have proven reliability and excellent performance when applied to industrial processes. However, their performance, robustness and stability become less reliable when the controlled process is very non-linear, is time varying and/or evolves in the presence of strong noises and perturbations. In these situations, it must be determined when the adaptive predictive control can be applied successfully, and when it may be advantageous to use the available real time process information to model the input/output relationship of the process. Thus, a new control solution is desired wherein:

a) The experience in the application of adaptive-predictive control could be used (i) to develop rules to determine in real time when adaptive-predictive control is advisable; and (ii) when adaptive-predictive control is advisable, to develop additional rules to determine how it must be applied and when adaptation of the AP model parameters must be performed.

b) When adaptive-predictive control is not advisable, the experimental knowledge of the human operator should be taken in to account by a further set of rules that will apply an "intelligent" control vector to the process.

The present invention is an improvement over the previously disclosed adaptive-predictive control systems, as indicated in the above mentioned U.S. Pat. Nos. 4,358,822 and 4,197,576, and United Kingdom Patent No. 1583545.

SUMMARY OF THE INVENTION

The adaptive-predictive expert control system of the present invention adds an expert block into the operation of previously known adaptive-predictive control systems. The expert control determines and/or modifies the operation of the driver block, the control block and the adaptive mechanism of the previous art. The expert block operates with different sets of rules, for example:

a) A first set of rules which can determine whether or not the control block can use the AP model to generate a control vector by applying adaptive-predictive control as defined by the previous art.

b) When the AP model can be used to generate the control vector, a second set of rules can determine whether or not the parameters of the AP model can be updated from the real time process I/O variables measurements.

c) When the AP model can be used to generate the control vector, a third set of rules can determine whether or not control limits applied to the predicted control vector must be reduced appropriately.

d) When the AP model should not be used to generate the control vector, the control block will use a fourth set of rules, based on the human operator control experience, to generate the control vector to be applied to the process.

e) When the AP model can be used to generate the control vector, a fifth set of rules can determine whether or not the performance criterion of the driver block must be redefined.

f) When the AP model can be used to generate the control vector, a sixth set of rules can determine whether or not the parameters of the AP model must be reinitialized to some predefined values.

The above considered sets of rules, within the expert block, imitate in different ways human intelligence. For instance, these rules can take into account specific domains in which the process I/O variables may reside and the length of "time of residence", understanding by "time of residence" the number of consecutive control periods that the process I/O variables remain in a specific domain.

The relation between the sets of rules and the specific domains and times of residence may be defined, for instance, as follows:

1) The first set of rules may examine a first domain and a first time of residence for a dynamic process output vector, containing at least one process output variable. The first set of rules can then determine that adaptive-predictive control will be applied when the dynamic process output vector resides in the first domain for a period of time in excess of the predetermined first time of residence.

2) The second set of rules may examine a second domain and a second time of residence for the dynamic process output vector. The second set of rules can determine that adaptation by updating the AP model parameters should be stopped while adaptive-predictive control is applied. The updates to the AP model can be halted when the dynamic process output vector resides in the second domain for a period of time in excess of the second time of residence.

3) The third set of rules may examine a third domain and a third time of residence for the dynamic process output vector. The third set of rules can carry out an appropriate tightening of control limits while adaptive-predictive control is applied. The tightening of control limits is applied when the dynamic process output vector resides in the third domain for a period of time in excess of the third time of residence.

In addition, while the dynamic process output vector is in the domain for adaptive-predictive control, the expert block will always be able to modify the control block parameters and/or to redefine the driver block performance criterion taking into account the particular operating conditions of the process and the desired performance of the control system. Thus:

4) The fifth set of rules may examine the dynamic process output vector evolution to redefine the driver block performance criterion according to a desired control system performance. A first set of subdomains related to the domain for application of adaptive-predictive control is defined according to a desired control system performance criteria. The redefinition of the driver block performance criterion can occur when the dynamic output process vector enters and resides in a subdomain of the first set of subdomains for a predetermined time of residence.

5) The sixth set of rules may examine the dynamic process output vector evolution to determine when the parameters of the AP model should be partially or totally reinitialized. The reinitialization can use the experimental knowledge available for the process dynamics in a subdomain of a second set of subdomains. Again, the second set of subdomains is related to the domain for application of the adaptive-predictive control. The reinitialization can be applied when the dynamic process output vector resides in a subdomain of the second set of subdomains for a predetermined time of residence.

The distinctive feature of the present invention allows the adaptive-predictive expert control system to control processes submitted to the influence of noises and perturbations and/or with a highly non-linear dynamic and time varying nature in such a way that the performance, robustness and stability of the new system is significantly better than that of the previous art, as explained in the following.

As previously discussed, the functioning of the expert block allows to combine adaptive-predictive control with rule based control. The first one will be used in the domain of operation where it is possible to describe satisfactorily the process dynamic behavior by means of an AP model and, thus, achieve precise, high performance control, as described in the previous art, and the second one in the domain of operation where it is advisable to use the experience of the human operator and emulate his behavior by means of rules. As a matter of fact, inmost industrial applications of adaptive-predictive controllers, they are on automatic mode only in a certain domain of operation and, when the process goes away from this domain, the operator takes manual control over the plant. Thus, this distinctive feature of this invention allows to integrate the operators knowledge within the automatic control system, increasing in this way its robustness, autonomy and stability in the overall operation of the plant.

Also another distinctive feature of the present invention allows to stop the operation of the adaptive mechanism when the process should not apply adaptive-predictive control or when the process I/O variables attain a certain domain, in which the effect of noises and perturbations may cause an undesirable drift on the AP model parameters within the control block. For instance, this may happen when the process approaches stability and, in this situation, the level of noises and perturbations is relatively large in relation with the variation on the control vector. Then, it is advisable to disregard the process I/O variables information for estimation purposes and, therefore, to stop the updating of the AP model parameters. Otherwise the above mentioned drift in the AP model parameters originates unstability in the operation of the control system.

In a similar way an additional feature of the present invention allows to avoid the problem of large erratic predictive control actions that may for instance be originated when adaptive-predictive control tries to compensate for stochastic noises and perturbations, added on the dynamic process output vector, and the level of said stochastic noises and perturbations is relatively high in relation with the actual overall tendency on the evolution of the dynamic process output vector. The definition of a domain for limited control solves this problem providing a smooth and efficient control action, in spite of the stochastic noises that may act on the process, and avoiding high frequency large excursions on the control vector.

A further additional feature of the present invention allows to reinitialize totally or partially the parameters of the AP model within the control block when the dynamic process output vector under adaptive-predictive control evolves attaining subdomains of operation where important, even discontinuous, changes in the process dynamics may occur, as happens in a PH process or in a high performance aircraft. This further additional feature of the present invention uses the knowledge available about the process dynamics on said subdomains of operation to avoid the significant deterioration that said changes in the process dynamics may cause in the performance of the control system.

Another feature of the present invention allows modification of the driver block performance criterion to accommodate the desired performance of the control system to the operating conditions when required, thus improving the overall performance of the system.

In the following detailed description of the invention, the adaptive-predictive expert control system is presented as an extension of the previous adaptive-predictive control system disclosed in the U.S. Pat. No. 4,197,576, in order to allow a better and simple understanding of the invention, but also includes features of other disclosures of the previous art, such as those of the European Patent No. 0037579 and the U.S. Pat. No. 4,358,822. For instance, in the U.S. Pat. No. 4,197,576 the prediction horizon used is equal to 1, but the invention may be directly applied just as easily to an embodiment with a larger prediction horizon, as that considered in European Patent No. 0037578 and U.S. Pat. No. 4,358,822. It is important to emphasize that the invention is an extension of the previous art on adaptive-predictive control and therefore may be applied as an extension of any of the embodiments of said previous art.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3(*b*) is a graph showing the control signal for the process of FIG. 3(*a*).

DETAILED DESCRIPTION OF THE INVENTION

Figure 2:
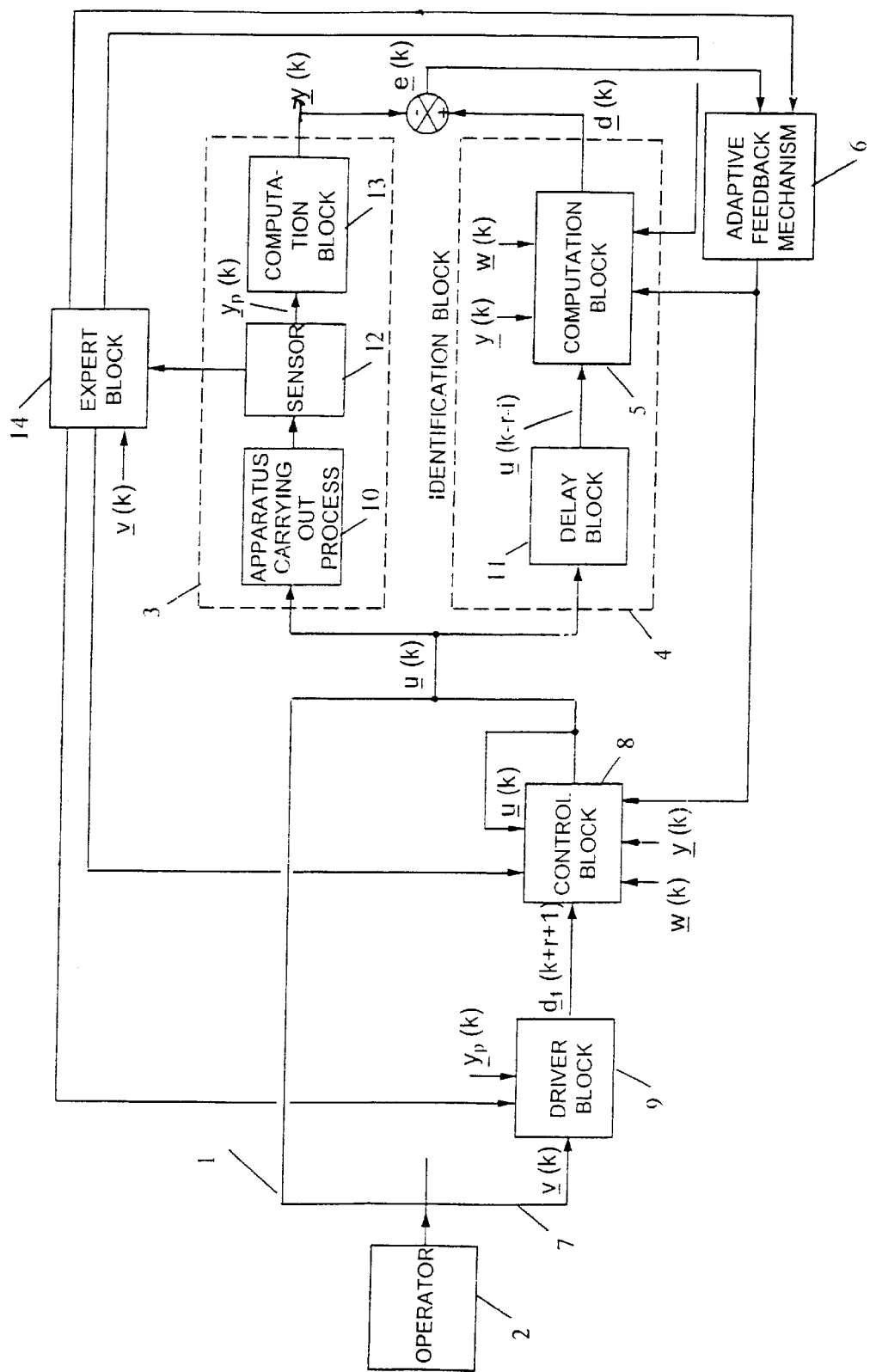
FIG. 2 is a schematic representation showing the general and conceptual structure of the adaptive-predictive expert control system according to the present invention.

Referring now to the drawings, wherein like numerals indicate like elements, there is shown in FIG. 2 a block diagram which provides a pictorial representation of both the apparatus carrying out the process being controlled and the adaptive-predictive expert control system which controls the operation of the apparatus. It should be recognized, however, that various elements of this diagram do not necessarily represent physically separate entities but rather indicate the different functions which are carried out by a single digital computer. Of course, since different elements of the computer combine to carry out the different functions of the process, each element in FIG. 2 may properly be considered a separate means for carrying out the specified function.

Figure 1:
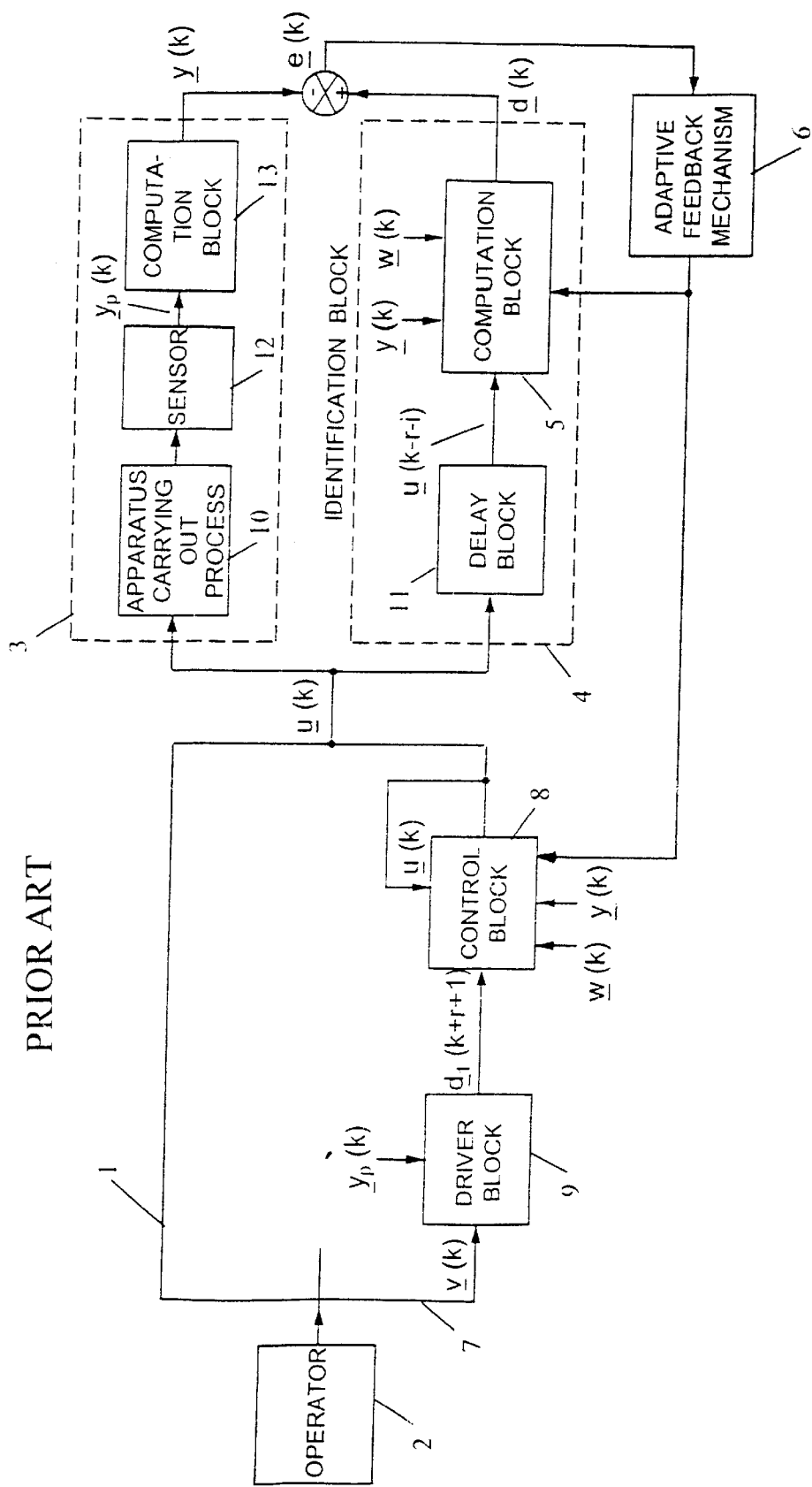
FIG. 1 is a schematic representation showing the general and conceptual structure of adaptive-predictive control systems, according to prior art embodiments.

From the comparison between FIGS. 1 and 2, it can be seen that basically the present invention adds and integrates the operation of the expert block 14 modifying the operation of the prior art system. The operation of expert block 14 is described as a part of the overall description of the adaptive predictive expert control system as follows.

At any sampling instant k, a human or an automatic operator 2 may decide to directly apply a control vector $\underline{u}(k)$ to the apparatus 10 carrying out the process being controlled, as shown by path 1. Alternatively, operator 2 may decide on automatic operation of the adaptive-predictive expert control system. When the adaptive-predictive expert control system is under automatic operation, two different actions may consecutively be performed at each sampling instant k, which are described in the following:

(A) Identification action: In the identification action, the control vector $\underline{u}(k)$ is applied to both the apparatus 10 carrying out the process being controlled and the identification block 4 as shown in FIG. 2. The identification block 4 uses and adaptive-predictive (AP) model stored in computation block 5 to compute an estimated incremental process output vector $\underline{d}(k)$. The parameters of the AP model can be initialized or reinitialized by expert block 14, taking into account the information received from sensor 12 and the sixth set of rules described above. The sixth set of rules considers the second set of subdomains related to the domain for application of adaptive-predictive control and their respective times of residence. An error vector $\underline{e}(k)$, which represents the difference between the actual and the estimated incremental process output vectors $\underline{y}(k)$ and $\underline{d}(k)$, respectively, is used to update the parameters of the previously mentioned adaptive-predictive model through an adaptive feedback mechanism 6. However, this updating will take place only if permitted by expert block 14. Expert block 14 makes an update decision based on information received from sensor 12, input from an operator 2 (input vector $\underline{v}(k)$, described below) and the second set of rules described above. The second set of rules considers the second domain and time of residence for the dynamic process output vector, to decide whether to stop adaptation, as set forth in some detail in operation (C) below. The control vector $\underline{u}(k)$ is delayed by r+1 sampling periods in delay block 11 before being acted upon by computation block 5.

(B) Control action: The above identification action may take place always before the control action is executed. As shown by path 7 the control vector $\underline{u}(k)$ to be applied to apparatus 10 carrying out the process to be controlled is computed by control block 8. This computation is carried out under the control of expert block 14, based on the information received from sensor 12 and the first set of rules described above, which considers the first domain and time of residence for an adaptive-predictive control. The computation can be carried out in the following two ways:

1. Predictive control computation: this computation will be performed by control block 8 using the same updated AP model as the identification block 4, in such a manner that a predicted control vector $\underline{\hat{u}}(k)$ is first computed. Said predicted control vector $\underline{\hat{u}}(k)$ makes the desired incremental output vector of the process $\underline{d}_1(k+r+1)$, at the sampling instant k+r+1, equal to the corresponding predicted incremental process output vector $\underline{d}_1'(k+r+1)$, at the same instant k+r+1, where r is the number of sampling time delays observed or conveniently considered in the process. The desired incremental process output vector $\underline{d}_1(k+r+1)$ is explicitly or implicitly computed at the instant k by the driver block 9 in response to input vector $\underline{v}(k)$ from operator 2. The input of driver block 9 is directly or indirectly set by the operator of the control system and represents the desired setpoint value of the output of the process. Driver block 9 generates, according to a certain performance criterion, the desired process output trajectory which is the desired dynamic trajectory over which the process output should reach the desired steady output, i.e. the said setpoint value. The performance criterion of driver block 9 can be initially defined and later on redefined by expert block 14, taking into account the information received from sensor 12 and the fifth set of rules described above. The fifth set of rules considers the first set of subdomains of the domain for adaptive-predictive control. The value of the desired process output trajectory is $\underline{d}_p(k+r+1)$ at sampling instant k+r+1. The vector $\underline{d}_p(k+r+1)$ permits the incremental process output vector $\underline{d}_1(k+r+1)$ to be computed, as set forth in some detail in the description of operation (G). As $\underline{\hat{u}}(k)$ would not act in the process output vector until the instant k+r+1, the desired incremental output vector of the process $\underline{d}_1(k+r+1)$ must be explicitly or implicitly known at instant k in order to compute û(k). The number r represents the number of sampling time delays considered in the process. Secondly, the predicted control vector û(k) will be limit checked, as part of the predictive control computation in control block 8, in order to obtain the control vector u(k) to be applied to apparatus 10 carrying out the process to be controlled. Expert block 14, based on the information received from sensor 12 and the third set of rules, which considers the third domain and time of residence for limited control, will determine when the control limits to be applied on said predicted control vector will have to be reduced in control block 8, as set forth in some detail in operation (I).

2. Intelligent control computation: In this case, the control vector to be applied to apparatus 10 will be computed by control block 8 based on said fourth set of rules which imitates the human operator behavior and that may be materialized using any of the well known intelligent, expert or fuzzy control techniques.

To properly control the process carried out by apparatus 10 the adaptive-predictive expert control system uses absolute and incremental values of the output, input and measurable disturbance vectors of the process. The sequence of specific operations that the adaptive predictive expert control system will carry out at every sampling instant k during its automatic operation is described as follows:

(A) Measurement (by sensor 12), and, if it is considered convenient, filtering of the output variables of the process carried out by apparatus 10 to obtain the dynamic process output vector $\underline{y}_p(k)$, the dimension of which is considered to be n.

(B) Computation of the incremental output vector $\underline{y}(k)$ (in computation block 13) by:

$$\underline{y}(k) = \underline{y}_p(k) - \underline{y}_p(k-\gamma) \quad (1)$$

where γ is an integer that can be conveniently chosen and which represents the number of sampling periods upon which the incremental process output vector $\underline{y}(k)$ is computed.

(C) Computation in expert block 14 of the variables that determine whether the dynamic process output vector $\underline{y}_p(k)$ is in the domain for adaptive-predictive control and/or in the domain for stopping adaptation and/or in the domain for limited control, respectively, and their corresponding times of residence. A way of calculating these variables is described in the following points:

1. The variables pcd(k) and pct(k) indicate if $\underline{y}_p(k)$ is in the domain for adaptive-predictive control and its time of residence, respectively, and their values are obtained as follows:

(i) if $\underline{y}_p(k) \in PCD$, then $pcd(k)=1$, otherwise $pcd(k)=0$, being PCD the domain for adaptive-predictive control, i.e. the set of values of $\underline{y}_p(k)$ that may determine the application of adaptive-predictive control. This set may be defined by the operator, for instance, by means of an upper limit, $y_{pcu}$, and a lower limit, $y_{pcl}$, on the value of $\underline{y}_p(k)$.

(ii) if $pcd(k)=1$, then $pct(k)=pct(k-1)+1$, otherwise $pct(k)=0$.

2. The variables sad(k) and sat(k) indicate if $\underline{y}_p(k)$ is in the domain for stopping adaptation and its time of residence, respectively, and their values are obtained as follows:

(i) if $\underline{y}_p(k) \in SAD$, then $sad(k)=1$, otherwise $sad(k)=0$, being SAD the domain for stopping adaptation, i.e. the set of values of $\underline{y}_p(k)$ inside PCD that may determine that the operation of the adaptive feedback mechanism 6 is stopped. This set may be defined by the operator, for instance, by means of an upper limit, $y_{sau}$, and a lower limit, $y_{sal}$, on the value of $\underline{y}_p(k)$ around the setpoint value $\underline{v}(k)$.

(ii) If $sad(k)=1$, then $sat(k)=sat(k-1)+1$, otherwise $sat(k)=0$.

3. The variables lcd(k) and lct(k) indicate if $\underline{y}_p(k)$ is in the domain for limited control and its time of residence, respectively, and their values are obtained as follows:

(i) if $\underline{y}_p(k) \in LCD$, then $lcd(k)=1$, otherwise $lcd(k)=0$, being LCD the domain for limited control, i.e. the set of values of $\underline{y}_p(k)$ inside PCD that may determine the reduction of the control limits on the control vector to be applied on apparatus 10. This set may be defined by the operator, for instance, by means of an upper limit, $y_{lcu}$, and a lower limit $y_{lcl}$, on the value of $\underline{y}_p(k)$ around the setpoint value $\underline{v}(k)$.

(ii) If $lcd(k)=1$, then $lct(k)=lct(k-1)+1$, otherwise $lct(k)=0$.

From the values of the above defined variables expert block 14 will compute the variables pc(k), sa(k) and lc(k) as described in the following:

If $pcd(k)=1$ and $pct(k) > pctl \geq 0$ then $pc(k)=1$, otherwise $pc(k)=0$.

If $sad(k)=1$ and $sat(k) > satl \geq 0$ then $sa(k)=1$, otherwise $sa(k)=0$.

If $lcd(k)=1$ and $lct(k) > lctl \geq 0$ then $lc(k)=1$, otherwise $lc(k)=0$.

The values of pctl, satl and lctl may be appropriately selected by the operator.

From the values of the previously defined variables pc(k), pa(k) and lc(k), expert block 14 will determine the sequence of specific operations here considered, according to the following rules:

(a) Operations (G), (H) and (I) below, which allow the computation of adaptive-predictive control, will be executed only if the value of the variable pc(k) is equal to 1, and particularly the control limits on the control signal to be applied to apparatus 10 will be reduced in (I) only if the variable lc(k) is equal to 1.

(b) The following operations (D), (E) and (F), which allow the updating of the AP model parameters, will be executed only if the value of pc(k) is equal to 1 and the value of sa(k) is equal to 0.

(c) Finally, operation (J), the last of the sequence, will be executed only if the variable pc(k) is equal to 0.

Also in operation (C) the computation in expert block 14 of the variables, that determine if the dynamic process output vector is in anyone of the subdomains of said first and second sets of subdomains of said domain for adaptive-predictive control and their corresponding times of residence, may be carried out in a similar way to that described above for the variables previously considered in this operation.

(D) Computation in identification block 4 (if $pc(k)=1$ and $sa(k)=0$) of the estimated incremental process output vector $\underline{d}(k)$ by the AP model, which can be defined by:

$$\underline{d}(k) = \sum_{i=1}^{h} A_i(k-1)\underline{y}(k-i-r_1) + \quad (2)$$

$$\sum_{i=1}^{f} B_i(k-1)\underline{u}(k-i-r) + \sum_{i=1}^{g} C_i(k-1)\underline{w}(k-i-r_2)$$

Where the vector $\underline{u}(k-i-r)$ and $\underline{w}(k-i-r_2)$ are obtained by:

$$\underline{u}(k-i-r) = \underline{u}_p(k-i-r) - \underline{u}_p(k-i-r-\gamma) \quad (3)$$

$$\underline{w}(k-i-r_2) = \underline{w}_p(k-i-r_2) - \underline{w}_p(k-i-r_2-\gamma) \quad (4)$$

where $\underline{u}_p(k-i-r)$ and $\underline{w}_p(k-1-r_2)$ are the control and the measurable disturbances vectors, respectively, of dimensions $n_1$ and m, at the sampling instants $k-i-r$ and $k-i-r_2$, respectively. In equation 2, the integers h, f and g can be conveniently chosen, and likewise the integers $r_1$ and $r_2$ can also be conveniently chosen taking into account the available or forecasted measurements of the output and disturbances vectors, respectively. The matrices $A_i(k-1)$, $B_i(k-1)$ and $C_i(k-1)$ of the AP model have appropriate dimensions and their values, that correspond to past values before being updated at time k, can be initialized and reinitialized totally or partially by expert block 14 taking into account the information received from sensor 12 and the sixth set of rules described above, which considers said first set of subdomains of said domain for adaptive-predictive control and their respective times of residence. If the dimension of the control vector is bigger than the dimension of the dynamic process output vector then, in most cases, supplementary conditions should be added to obtain a unique solution, or simply some of the control vector components can be included in the disturbance vector; as a particular case it will be considered that $n_1 = n$.

(E) Computation (if pc(k)=1 and sa(k)=0) of the incremental error vector by:

$$\underline{e}(k) = \underline{y}(k) - \underline{d}(k) \quad (5)$$

(F) Computation in adaptive feedback mechanism 6 (if pc(k)=1 and sa(k)=0) of the updated values at instant k of the parameters $a_{ijq}(k)$ and $b_{ijq}(k)$ and $c_{ijq}(k)$, that are the elements in the jth row and qth column of the matrices $A_i(k)$, $B_i(k)$ and $C_i(k)$, respectively, by means of any of the algorithms defined in the previous art, for instance by means of the following algorithms:

$$a_{ijq}(k) = \beta_{aijq}\alpha_j(k)e_j(k)y_q(k-i-r_1) + a_{ijq}(k-1) \quad (6)$$

$$b_{ijq}(k) = \beta_{bijq}\alpha_j(k)e_j(k)u_q(k-i-r) + b_{ijq}(k-1) \quad (7)$$

$$c_{ijq}(k) = \beta_{cijq}\alpha_j(k)e_j(k)w_q(k-y-r_2) + c_{ijq}(k-1) \quad (8)$$

where $e_j(k)$, $y_q(k-i-r_1)$, $u_q(k-i-r)$ and $w_q(k-i-r_2)$ are the corresponding components of the vectors $\underline{e}(k)$, $\underline{y}(k-i-r_1)$, $\underline{u}(k-i-r)$ and $\underline{w}(k-i-r_2)$, respectively. The coefficients $\beta_{aijq}$, $\beta_{bijq}$ and $\beta_{cijq}$ can be conveniently tuned and $\alpha_j(k)$ are variable gains, which may be chosen, for instance, as follows:

$$\alpha_j(k) = \quad (9)$$

$$1 / \left[ 1 + \sum_{i=1}^{h}\sum_{q=1}^{n}\beta_{aijq}y_q(k-1-r_1)^2 + \sum_{i=1}^{f}\sum_{q=1}^{n}\beta_{bijq}u_q(k-i-r)^2 + \right.$$

-continued $$\left. \sum_{i=1}^{g}\sum_{q=1}^{m}\beta_{cijq}w_q(k-i-r_2)^2 \right] \quad (j=1, n)$$

(G) Computation in driver block 9 (if pc(k)=1) of the desired process output vector and the desired incremental process output vector at sampling instant k+r+1, which can be carried out explicitly or implicitly using any of the designs of the previous art on adaptive-predictive control and particularly the general one defined in U.S. Pat. No. 4,358,822, considered as follows:

At each sampling instant k, the driver block 9 selects a desired dynamic output trajectory between sampling instants k+r+1 and k+r+1+λ with λ≧0, said desired trajectory being equal to a specific process output trajectory, between sampling instants k+r+1 and k+r+1+λ, that the adaptive-predictive model predicts would be caused by a specific sequence of future control vectors between sampling instants k and k+λ, and such that the specific process output trajectory and the specific future control vector sequence optimize a chosen performance criterion in which a future reference trajectory of process output vectors can be explicitly considered, said reference trajectory can be periodically redefined as a function of the previously measured process output and evolve according to the desired dynamics to the setpoint. The optimization of the chosen performance criterion can be obtained through the minimization of a certain index, I, which characterizes the selected performance criterion. Said index may vary as a function of at least one of a reference trajectory of process output vectors, a set point of said process, previously measured and predicted process output and control vectors, constraints on the values of said control vectors and any other parameter or variables that influence the control performance of said process.

Several indexes were considered by the way of examples in the description of the previous art presented in European Patent No. 0037579 and U.S. Pat. No. 4,358,822. As an illustrative example we will here consider, for reasons of simplicity, the following one:

$$I = \underline{y}'_p(k+r+1) - \sum_{i=1}^{t} F_i \underline{y}_p(k+r+1-r_1-i) + \sum_{i=1}^{s} H_i \underline{v}(k+1-i) \quad (10)$$

Note that this index is a particular case of said general design previously considered in which λ is equal to zero, $\underline{y}'_p(k+r+1)$, $\underline{y}_p(k+r+1-r_1-i)$ and $\underline{v}(k+1-i)$ are the predicted process output vector, the process output vector and the driver block input vector at the sampling instants k+r+1, $k+r+1-r_1-i$ and k+1-i, respectively, $\underline{v}(k+1-i)$ is a vector of dimension n, that is generated directly or indirectly by the operator; and the matrices $F_1(i=1, t)$ and $H_1(i=1, s)$, as well as the integers t and s, can be chosen freely, to take into account the desired dynamics (i.e. to define the desired dynamics). The minimization of index (10) implies:

$$d_p(k+r+1) = \sum_{i=1}^{t} F_i y p(k+r+1-r_1-i) + \sum_{i=1}^{s} H_i \underline{v}(K+1-i) \quad (10a)$$

where $\underline{d}_p(k+r+1)$ of dimension (n×1) is the desired process output vector at sampling instant k+r+1, i.e. the specific value of the predicted process output $\underline{y}'_p(k+r+1)$ at the sampling time instant k+r+1 that minimizes index (10).

From the value of the desired process output vector $\underline{d}_p(d+r+1)$, computed by equation (10a), the desired incremental output vector $\underline{d}_1(k+r+1)$ can be easily computed in various manners; a particular one, usually convenient when γ>r, is given by the following equation:

$$\underline{d}_1(k+r+1) = d_p(k+r+1) - \underline{y}_p(k+r+1-\gamma) \tag{11}$$

If found necessary the value of $\underline{d}_1(k+r+1)$ can be limit checked. The choice of index (10) was illustrated in the experimental examples of the previous art. The computation of the predicted control vector, $\hat{\underline{u}}_p(k)$, and the predicted incremental control vector at sampling instant k, $\hat{\underline{u}}(k)$, at sampling instant k, which minimizes index (10) is considered in operation (H) below.

According to one of the distinctive features of the present invention, the initial index selected, to determine the operation of the driver block, can also be redefined on real time by expert block 14 taking into account the information received from sensor 12 and said fifth set of rules, which considers said second set of subdomains of said domain for adaptive-predictive control and their corresponding times of residence.

(H) The computation of the predicted control vector and the predicted incremental control vector in control block 8 (if pc(k)=1) is intimately related to the above considered operation (G). This computation was considered and illustrated for several indexes, by the way of examples, in the description of the previous art presented in European Patent No. 0037579 and U.S. Pat. No. 4,358,822. In fact, operation (G) determines at least implicitly the value of the predicted control vector at instant k, since the predicted control vector corresponds to the value at instant k of said specific future control vector sequence that minimizes the index considered in operation (G). This is equivalent to saying that the predicted control vector at instant k is the one that makes the predicted process output at instant k+r+1 equal to the value of the desired process output trajectory at the same future sampling instant k+r+1. Therefore, in general, the explicit computation of the predicted control vector at instant k can be made, using the AP model, from the value of the desired process output trajectory at instant k+r+1. Particularly, in the case in which the performance index is defined by (10), and integers γ, $r_1$ and $r_2$ are chosen such that γ>r, $r_1 \geq r$ and $r_2 \geq r$, the considered explicit computation may be carried out according to the following:

1. From the updated AP model (updated by the output of adaptive feedback mechanism 6), the predicted incremental process output vector $\underline{d}_1'(k+r+1)$ at the sampling instant k+r+1, will depend upon the predicted incremental control vector $\hat{\underline{u}}(k)$ and is given by the equation:

$$\underline{d}_1'(k+r+1) = \sum_{i=1}^{h} A_i(k)\underline{y}(k+r+1-r_1-i) + \sum_{i=2}^{f} B_i(k)\underline{u}(k+1-i) + \sum_{i=1}^{g} C_i(k)\underline{w}(k+r+1-r_2-1) + B_1(k)\hat{\underline{u}}(k) \tag{12}$$

The predicted incremental control vector $\hat{\underline{u}}(k)$ is computed by making the corresponding predicted incremental process output vector $\underline{d}_1'(k+r+1)$ equal to the desired incremental output vector $\underline{d}_1(k+r+1)$, and is given by:

$$\hat{\underline{u}}(k) = B_1(k)^{-1}\underline{d}_1(k+r+1) - B_1(k)^{-1}\sum_{i=2}^{f} B_i(k)\underline{u}(k+r+1) - B_1(k)^{-1}\sum_{i=1}^{h} A_i(k)\underline{y}(k+r+1-r_1-i) - B_1(k)^{-1}\sum_{i=1}^{g} C_i(k)\underline{w}(k+r+1-r_2-i) \tag{13}$$

2. From $\hat{\underline{u}}(k)$, the predicted process control vector $\hat{\underline{u}}_p(k)$ will be computed by:

$$\hat{\underline{u}}_p(k) = \hat{\underline{u}}(k) + \underline{u}_p(k-\gamma) \tag{14}$$

where $\underline{u}_p(k-\gamma)$ is the limited process control vector applied to the apparatus 10 at instant k−γ. The computation of this limited process control vector at instant k is considered in the next operation.

(I) Computation in control block 8 (if pc(k)=1) of the limited process control vector, $\underline{u}_p(k)$, to be applied to the apparatus 10 carrying out the process being controlled, is made by applying absolute and incremental limits to the previously computed predicted process control vector $\hat{\underline{u}}_p(k)$. Absolute upper $\underline{u}_{pu}$ and lower $\underline{u}_{pl}$ limits conveniently chosen will be first applied to the predicted process control vector $\hat{\underline{u}}_p(k)$ to obtain a first value of $\underline{u}_p(k)$. Therefore, $\underline{u}_p(k)$ will be made equal to $\hat{\underline{u}}_p(k)$, unless $\hat{\underline{u}}_p(k)$ is beyond the chosen absolute limits, in which case, $\underline{u}_p(k)$ will be made equal either to $\underline{u}_{pu}$ or to $\underline{u}_{pl}$. Secondly, in order to compute the final value for $\underline{u}_p(k)$, an incremental limit $\underline{u}_{il}(k)>0$ will be applied to said first value of $\underline{u}_p(k)$ as follows:

(i) If $\underline{u}_p(k) - \underline{u}_p(k-1) > \underline{u}_{il}(k)$, then $\underline{u}_p(k) = u_p(k-1) + \underline{u}_{il}(k)$; and (ii) If $\underline{u}_p(k) - \underline{u}_p(k-1) < -\underline{u}_{il}(k)$, then $\underline{u}_p(k) = \underline{u}_p(k-1) - \underline{u}_{il}(k)$;
If $\underline{u}_p(k) - \underline{u}_p(k-1) < \underline{u}_{ie}(k)$, then $\underline{u}_p(k) = \underline{u}_p(k-1) - \underline{u}_i(k)$.

Before being applied as indicated above, the value of said incremental limit $\underline{u}_{il}(k)$ can be computed in different ways and, for instance, according to the following points:

1. If lc(k)=0, the $\underline{u}_{il}(k) = \underline{u}_{ild}$, where $\underline{u}_{ild}$ is a default value conveniently chosen.
2. If lc(k)=1, then $\underline{u}_{il}(k) = \underline{u}_{ild} df^{lct(k)}$, where df is a conveniently chosen decreasing factor such that 1>df>0.
3. If $\underline{u}_{il}(k) < \underline{u}_{il1}$, then $\underline{u}_{il}(k) = \underline{u}_{il1}$, where $\underline{u}_{il1}$ is a conveniently chosen lower value for the incremental limit.

From the final value of the limited process control vector $\underline{u}_p(k)$, the value of the limited incremental process control vector $\underline{u}(k)$, to be applied to apparatus 10, is obtained as follows:

$$\underline{u}(k) = \underline{u}_p(k) - \underline{u}_p(k-\gamma) \tag{15}$$

(J) Computation in control block 8 (if pc(k)=0) of the control vector $\underline{u}_p(k)$ to be applied to the apparatus 10 carrying out the process to be controlled by means of a set of rules that imitate the human operator behavior and that may be easily implemented using any of the well known intelligent, expert or fuzzy control techniques or equivalent.

In its implementation, the adaptive predictive expert control system can use incremental input, output and disturbance vectors as described in the above operations.

An alternative method of implementing the system is to compute the incremental input, output and disturbance vectors with respect to some constant vectors chosen conveniently and, consequently, in the specific equations described above the equations 1, 3, 4, 11, 14 and 15 need to be respectively modified as follows:

$$\underline{y}(k)=\underline{y}_p(k)-\underline{y}_{ss} \quad (16)$$

$$\underline{u}(k-i-r)=\underline{u}_p(k-i-r)-\underline{u}_{ss} \quad (17)$$

$$\underline{w}(k-i-r_2)=\underline{w}_p(k-i-r_2)-\underline{w}_{ss} \quad (18)$$

$$\underline{d}_1(k+r+1)=\underline{d}_p(k+r+1)-\underline{y}_{ss} \quad (19)$$

$$\hat{\underline{u}}_p(k)=\hat{\underline{u}}(k)+\underline{u}_{ss} \quad (20)$$

$$\underline{u}(k)=\underline{u}_p(k)-\underline{u}_{ss} \quad (21)$$

Likewise, when it is considered convenient to give specific constant values to some of the AP model parameters (for instance, because of a certain knowledge of the process), these values can be given to the respective parameters, and the corresponding β coefficients will be set to zero. Also, it is possible to stop the updating operations of the adaptive-predictive model parameters as long as it is considered convenient.

If desired the identification action may be performed at any time, even when the control vector is not computed by the adaptive predictive expert control system by carrying out operations (A), (B), (D), (E) and (F), and this identification action can be performed in real time or off-line and even in between the sampling intervals.

It will be observed that in the operation (H) to compute $\hat{u}(k)$, the matrix $B_1(k)$ must be inverted. The risk of singularity of matrix $B_1(k)$ can almost always be avoided by adding time delays to the components of the input and output process vectors, and controlling the resultant process. An illustrative experimental example of this procedure was presented in the previous art.

EXPERIMENTAL EXAMPLE

The adaptive predictive expert control system, previously described, has been implemented for the control of a simulated pH process, as described in the following.

A pH process typically mixes a flow of an acid solution with a flow of a base solution and tries to control the resultant pH of the mix by manipulating the flow rate of the base solution. This pH control has been for many years an example of control difficulties in nonlinear chemical processes. The main difficulty comes from the fact that the gain of the process changes drastically (increases) when the pH value of the mix enters in a region around the value of 7. The pH set point is usually in this region.

The simulated pH process considers that the dynamic relationship between the incremental pH of the mix at instant k, $\Delta pH(k)$, and the incremental percentage of flow rate of the base solution, $u(k)$, is described, when the absolute value of the pH of the mix is lower than 4.4 or bigger than 9.6, by the following equation:

$$\Delta pH(k)=1.0089\Delta pH(k-1)-0.0879\Delta pH(k-2)+0.01622u(k-1)-0.00833u(k-2) \quad (22)$$

However, when the absolute value of the pH of the mix is between 4.4 and 9.6, the above equation (22) becomes:

$$\Delta pH(k)=1.0089\Delta pH(k-1)-0.0879\Delta pH(k-2)+0.1622u(k-1)-0.0833u(k-2) \quad (23)$$

The gain in equation (23) is ten times greater than in equation (22). Thus, when the absolute value of the pH enters the region between 4.4 and 9.6, the gain of the simulated process increases by ten times, which represents the main difficulty to control this kind of processes. Additionally, the simulation adds a measurement noise of zero mean and 0.1 standard deviation on the pH measured value.

The adaptive predictive expert system of this invention, solves easily this problem by defining an adaptive predictive control domain and a lower and an upper expert control domains. Said adaptive predictive control domain will be defined by a lower limit, $y_{pcl}$, and an upper limit, $y_{pcu}$, whose values in this case are 4.4 and 9.6, respectively.

Said lower expert control domain, will correspond to the values of pH under 4.4, and said upper expert control domain to the values of pH over 9.6.

Additionally, a domain for stopping adaptation and a domain for limited control may be defined assigning the following values to their lower and upper limits, respectively:

$$y_{sal}=6, y_{sau}=8, y_{1cu}=6.5 \text{ and } y_{1cl}=7.5.$$

Thus the adaptive predictive expert control system of this invention can now be applied to the previously considered simulated pH process, according to the sequence of specific operations (A) to (J), by:

(i) assigning values to the limits on the time of residence for the adaptive predictive control domain, pctl, the stopping adaptation domain, satl, and limited control domain, lctl. In this implementation these assigned values were: pctl=0, satl=2 and 1ctl=2.

(ii) assigning values to the parameters that determine the execution of adaptive predictive control, according to operations (A) to (I). In this implementation the assigned values for the main of said parameters were: γ=1, λ=1, h=2, f=2, r=0, $u_{pu}$=100, $u_{pl}$0, $u_{ild}$=4, $u_{il1}$=0.2, df=0.8. Additionally, the driver block parameters correspond to a desired second order dynamics with a damping ratio equal to 1 and a time constant equal to 1.5 control periods, and the initial values for the adaptive predictive model parameters are: $a_1(0)$=1, $a_2(0)$=−0.2, $b_1(0)$=0.1 and $b_2(0)$=0.1. As it may be observed, these initial values differ from those of equation (23) of the simulated process in the adaptive predictive domain.

(iii) determining the expert control to be applied in those expert domains previously defined. In this implementation, the expert control applied in said lower expert domain was $u_p(k)$=48, and in said upper expert domain was $u_p(k)$=51. These last two expert control signals were those that an expert operator would apply to drive the pH value towards the adaptive predictive control domain.

Figure 3A:
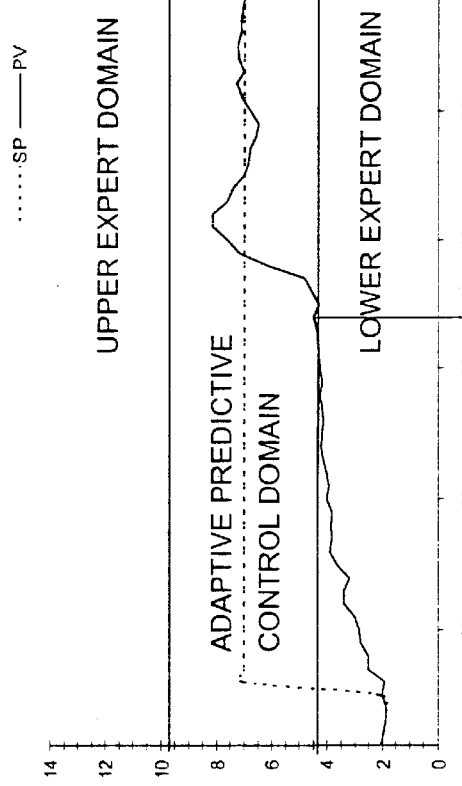
FIG. 3(*a*) is a graph showing the output of an adaptive-predictive expert controlled process.
Figure 3B:
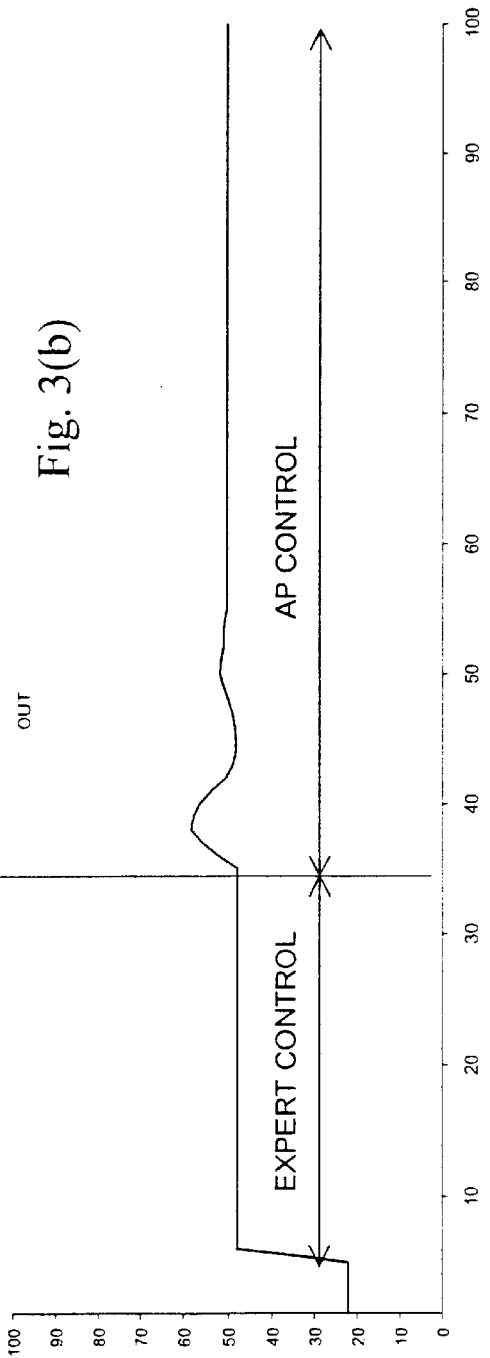

FIGS. 3(a) and 3(b) show, from the beginning of the control action, the results of a 100 control instants experiment, in which the simulated pH process was controlled from an initial pH value of 2, corresponding to a control signal of 22, to the set point of 7. In FIG. 3(a), the evolution of the pH value is shown, within the lower expert domain and the adaptive predictive control domain, until it reaches the set point value. FIG. 3(b) represents the evolution of the control signal over the same period of time.

It should be noted that for the control problem of a pH process, the adaptive predictive expert control system has provided a highly desirable solution. This solution is notable in light of the fact that the problem of controlling a pH process is a long and often-cited example of nonlinear chemical processes, for which it is difficult to provide adequate control.

In summary, the adaptive predictive expert control system described adds an expert block into the operation of previously known adaptive predictive control systems for controlling single-input single-output, or multi-variable time-variant processes with known or unknown parameters and with or without time delay. This expert block, based on rules and observable evolution of the process variables, determines and/or modifies the operation of the driver block, control block and adaptive feedback mechanism of the previous art, in order to improve the performance, robustness and stability of the overall control system.

While examples of the application of different adaptive-predictive control schemes have been cited in the above discussion, it should be evident that any adaptive-predictive control scheme can be used to implement the present invention. That is, the success of the invention does not depend with particularity on the adaptive-predictive scheme used.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for providing a control vector at a plurality of sampling instants k for an apparatus carrying out a process, wherein said process comprises:
   at least one input variable and at least one output variable;
   at least one of said input variables defining a process input vector;
   at least one of said output variables defining a process output vector;
   said apparatus varying said process input vector in accordance with a value of said control vector; and
   said method comprises:
      storing a model capable of predicting dynamic values of said process output vector at future sampling instants;
      using said model to calculate a predicted control vector at said sampling instant k that will produce a predicted dynamic process output vector at a future sampling instant k+r+1 equal to a desired process output vector at said future sampling instant k+r+1;
      applying control limits on said predicted control vector to produce a limited control vector;
      using a first set of rules based on an evolution of at least one of said at least one input variable and said at least one output variable to determine if said limited control vector should be used to provide said control vector; and
      selecting said control vector based on evolution of at least one of said at least one input variable, said at least one output variable and an empirical control experience when said first set of rules determines that said limited control vector should not be used to provide said control vector.

2. A method for providing a control vector according to claim 1, wherein:
   said future desired process output vector and said predicted control vector are obtained by minimizing an index of performance;
   said index of performance considers process output vector trajectories that said model predicts would be caused by future control vector sequences over a prediction horizon $\lambda+1$, being $\lambda+1$ a positive integer;
   said index varying as a function of at least one of a reference trajectory of process output vectors, a set point of said process, previously measured and predicted process output and control vectors, constraints on values of said control vectors and any other parameter or variables that influence control performance of said process.

3. A method for providing a control vector according to claim 2, further including determining if parameters of said model should be updated to reduce a difference between an actual output vector at said sampling instant k+r+1 and said predicted output vector at said sampling instant k+r+1, based on a second set of rules.

4. A method for providing a control vector according to claim 3, further including determining if said control limits applied on said predicted control vector should be reduced to enhance a feature of said method, based on a third set of rules.

5. A method for providing a control vector according to claim 4, further including redefining said index of performance in real time according to a fifth set of rules, said fifth set of rules taking into account an evolution of at least one of said at least one input variable and said at least one output variable.

6. A method for providing a control vector according to claim 5, further including reinitializing said parameters of said model in real time according to a sixth set of rules, said sixth set of rules taking into account an evolution of at least one of said at least one input variable and said at least one output variable.

7. A method for providing a control vector according to claim 6, wherein said calculation of said control vector based on evolution of at least one of said at least one input variable, said at least one output variable and said empirical control experience is made according to a fourth set of rules.

8. A method for providing a control vector according to claim 6, wherein said sixth set of rules is determined taking into account a second set of input and output variable subdomains for adaptive predictive control and corresponding times of residence.

9. A method for providing a control vector according to claim 7, wherein said fourth set of control rules can be selected from at least one of a known intelligent, expert and fuzzy control techniques.

10. A method for providing a control vector according to claim 6, wherein said model is always used to provide said control vector.

11. A method for providing a control vector according to claim 6, wherein said model includes pre-existing features of prior adaptive predictive control methods.

12. A method for providing a control vector according to claim 3, wherein said second set of rules is determined taking into account at least one domain and at least one time of residence for at least one of said at least one input variable and said at least one output variable for determining if said parameters should be updated.

13. A method for providing a control vector according to claim 4, wherein said third set of rules is determined taking into account at least one domain and at least one time of residence for at least one of said at least one input variable and said at least one output variable for reducing said control limits.

14. A method for providing a control vector according to claim 5, wherein said fifth set of rules is determined taking into account a first set of input and output variable subdomains for adaptive predictive control and corresponding times of residence.

15. A method for providing a control vector according to claim 1, wherein said first set of rules is determined taking into account at least one domain and at least one time of residence for at least one of said at least one input variable and said at least one output variable when applying adaptive predictive control.

16. An apparatus to provide a control vector to a device carrying out a dynamic process, comprising:

an input vector containing at least one input variable of said process;

an output vector containing at least one output variable of said process;

a process model effective to provide predicted values of said output vector at a plurality of future sampling instants;

a predicted control vector determined at a sampling instant k effective to produce a predicted output vector at a future sampling instant k+r+1 equal to a desired output vector at said future sampling instant k+r+1;

applying control limits on said predicted control vector to produce a limited control vector;

an intelligent control vector derived from empirical operator experience;

a first set of rules effective to select one of said limited control vector and said intelligent control vector as said control vector; and said device varies said input vector in accordance with said control vector.

17. An apparatus to provide a control vector according to claim 16, further including:

a second set of rules effective to determine if parameters of said process model should be updated effective to reduce a difference between an actual process output vector at a sampling instant k+r+1 and a predicted process output vector at said sampling instant k+r+1;

a third set of rules effective to determine if said control limits applied on said predicted control vector should be reduced;

a fourth set of rules effective to generate said intelligent control vector further based on an evolution of at least one of said at least one input variable and said at least one output variable;

an index of performance that considers process output vector trajectories that said process model predicts would be caused by future control vector sequences over a prediction horizon $\lambda+1$, being $\lambda+1$ a positive integer;

said index varying as a function of at least one of a reference trajectory of process output vectors, a set point of said process, previously measured and predicted process output and control vectors, constraints on values of said control vectors and any other parameter or variables that influence control performance of said process;

said desired output vector and said predicted control vectors are obtained by minimizing said index of performance;

a fifth set of rules effective to redefine in real time said index of performance based on an evolution of at least one of said at least one input variable and said at least one output variable; and a sixth set of rules effective to reinitialized said parameters of said process model based on an evolution of at least one of said at least one input variable and said at least one output variable.

18. An apparatus to provide a control vector according to claim 17, wherein:

said first set of rules is determined taking into account at least one domain and a corresponding time of residence for at least one of said at least one input variable and said at least one output variable related to application of adaptive predictive control;

said second set of rules is determined taking into account at least one domain and a corresponding time of residence for at least one of said at least one input variable and said at least one output variable related to stopping adaptation of said process model;

said third set of rules is determined taking into account at least one domain and a corresponding time of residence for at least one of said at least one input variable and said at least one output variable related to reducing control limits or said predicted control vector;

said fourth set of rules can be selected from at least one of a known intelligent, expert and fuzzy control technique;

said fifth set of rules is determined taking into account at least one subdomain and a corresponding time of residence for at least one of said at least one input variable and said at least one output variable of a domain related to application of adaptive predictive control; and said sixth set of rules is determined taking into account at least one subdomain and a corresponding time of residence for at least one of said at least one input variable and said at least one output variable of a domain related to application of adaptive predictive control.

19. An apparatus to provide a control vector according to claim 17, wherein said process model is always used to provide said control vector.

* * * * *